Patented Jan. 21, 1930

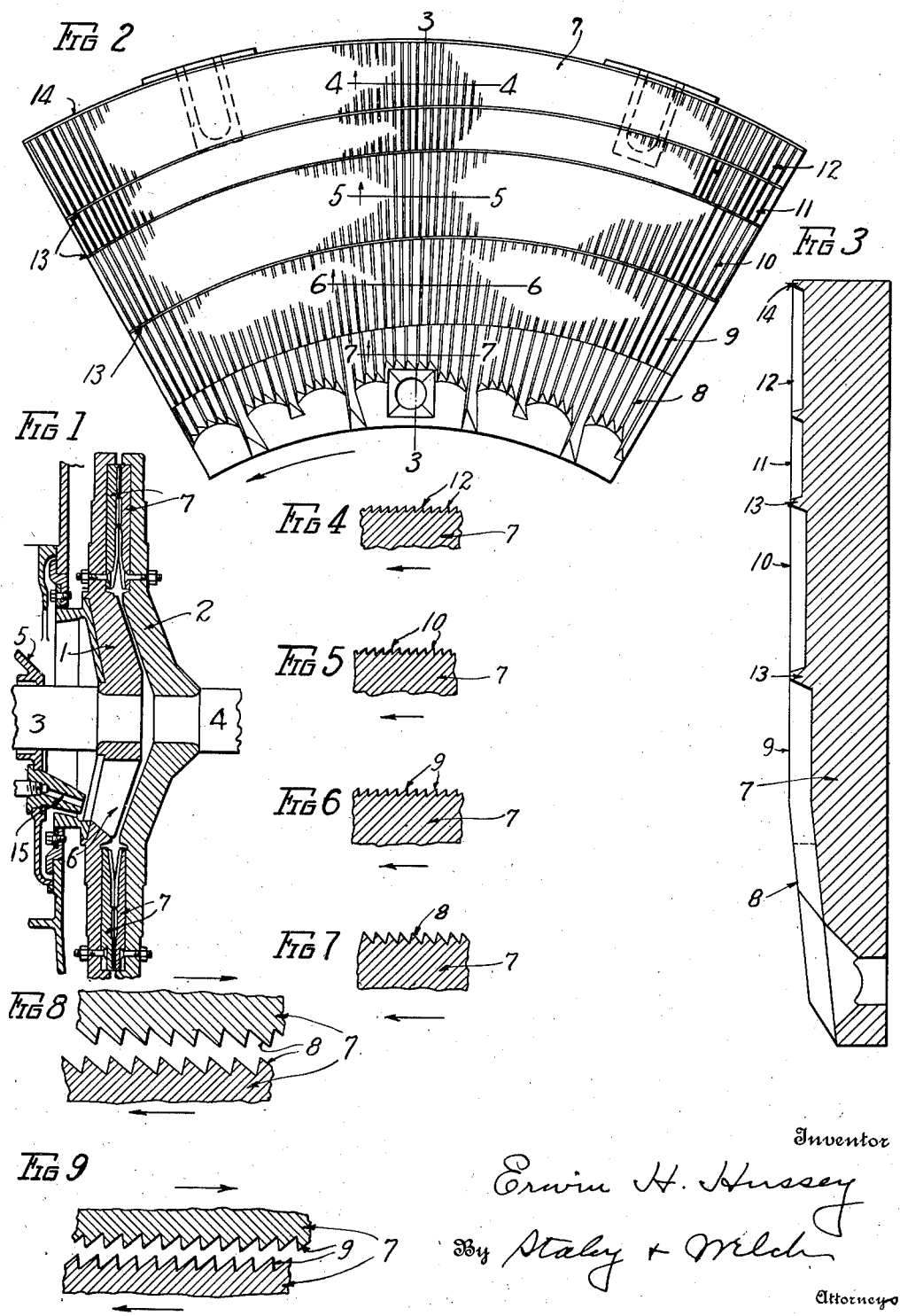

1,744,226

UNITED STATES PATENT OFFICE

ERWIN H. HUSSEY, OF MINNEAPOLIS, MINNESOTA, ASSIGNOR TO THE BAUER BROTHERS COMPANY, OF SPRINGFIELD, OHIO, A CORPORATION OF OHIO

ATTRITION MILL

Application filed March 8, 1928. Serial No. 260,135.

This invention relates to mills for making pulp from wood or other fibrous materials and in which are employed opposed relatively movable disks, it more particularly relating to the formation of the working faces of the disks.

An object of the invention is to provide disks having teeth or ribs so formed that the material passing between the same will be rolled, pressed and rubbed without cutting; a more specific object in this connection being to provide opposed teeth which are inclined from base to point in a direction opposite to the direction of rotation of the disk upon which they are located.

A further object of the invention is to provide disks having teeth or ribs so formed as to impart an initial disintegrating action upon the material and to thereafter roll, squeeze and rub the material to a pulped condition.

Referring to the drawings:

Fig. 1 is a vertical section through so much of an attrition mill as is necessary to illustrate this invention.

Fig. 2 is an elevation of the working face of one of the segmental plates forming the working surfaces of the disks.

Fig. 3 is an enlarged detail section on the line 3—3 of Fig. 2.

Fig. 4 is an enlarged detail section on the line 4—4 of Fig. 2.

Fig. 5 is an enlarged detail section on the line 5—5 of Fig. 2.

Fig. 6 is an enlarged detail section on the line 6—6 of Fig. 2.

Fig. 7 is an enlarged detail section on the line 7—7 of Fig. 2.

Fig. 8 is an enlarged detail section of two opposing plates showing the teeth arranged to impart a disintegrating action upon the material.

Fig. 9 is an enlarged detail section of two opposed plates showing the teeth inclined to impart a rolling, squeezing and rubbing action upon the material.

Referring to the drawings, 1 and 2 represent the heads of the disks, connected respectively to the shafts 3 and 4, which are both driven in the present case in opposite directions by electric motors or other suitable sources of power (not shown), although the invention is equally available to an arrangement in which one of the disks is stationary and the other rotatable. The material is fed from a chute 5 through the central eyes 6 in the head 1 and is fed outwardly between the disks by centrifugal force and discharged at the periphery. Each of the disks has secured thereto a series of segmental plates 7, the plates of both disks being constructed the same. The teeth all extend radially or substantially so and are arranged in rows. The inner row of teeth is indicated at 8 and is shown in Figs. 7 and 8, these teeth each having one of their sides inclined from base to point in the general direction of rotation, as a result of which the points or sharp edges of the teeth or opposing plates co-act to first disintegrate the material. The outer faces of these teeth, as well as a portion of the outer faces of the subsequent rows of teeth, are inclined so as to provide an outwardly converged throat between the opposing disks at this point.

In the subsequent rows of teeth, which are indicated at 9, 10, 11 and 12, and which are shown in detail in Figs. 4, 5, 6 and 9, the teeth each have one of their sides inclined from base to point oppositely to the general direction of rotation. The disks are adjusted so that the teeth 10, 11 and 12 and the straight portion of the teeth 9 on one disk nearly touch the corresponding teeth on the opposing plate, whereby the inclined surfaces of opposing teeth act upon the material to roll, squeeze and rub the same. In the production of pulp from wood or other material the action of disintegrating, squeezing, rolling and rubbing is performed in the presence of water which is admitted at the place indicated by 15 and also through the chute with the material. The distance between the teeth of subsequent rows decrease, those of the inner row being the greater distance apart and those of the outer row the lesser distance apart.

Between the rows of teeth 9, 10, 11 and 12 are preferably placed eccentric ribs 13 which act to retard the flow of the material between the disks and to throw the material into contact with the opposite disk for more complete hydrating action and a concentric rib 14 is also placed at the extreme outer edge of each plate for the purpose of allowing the material to be discharged only after hydration is completed.

In the production of pulp from wood or other fibrous material, the material, after being initially reduced or disintegrated by preliminary disintegration (not shown), is fed to the disks just described with the result that the material is first further disintegrated and then rolled, rubbed and squeezed in the presence of water so that the material is thoroughly reduced and hydrated so that it comes out in a perfectly pulped condition.

While the inner row only in the present instance has been shown provided with teeth of a disintegrating character, that is, teeth having their inclinations in the general direction of rotation, it is to be understood that such form of teeth may be provided in the one or more subsequent rows instead of teeth inclined oppositely to the direction of rotation in some cases where the nature of the material and quality of the pulp desired, as well as the required hydration demand it. In other words, the number of the disintegrating teeth may be proportionately greater to the rolling, squeezing and rubbing teeth if desired.

While the teeth shown are of a form having a sharp edge, it is to be understood that these teeth, or a part of them, may be of this form but having a rounded top.

By having the teeth or ribs which act finally upon the material so formed that they will act to roll, squeeze, press and rub the material between the same without any substantial cutting action, I am enabled to secure an improved pulp product in which the fibres are of considerably greater length than can be secured with other forms of pulping apparatus. The teeth which perform this final operation being inclined from base to point in a direction opposite to that of the rotation of the disks, it will be seen that the action is to roll, squeeze, press and rub the material between the inclined faces of the teeth, which acts to reduce the cross-section of the fibrous material but does not cut the material as to length.

Having thus described my invention I claim:

1. In a mill of the character described, opposed relatively movable disks, teeth on each of said disks which cooperate with the teeth of the other disk, said teeth being so inclined and disposed with relation to the teeth of the other disk as to roll, rub and crush the material between opposed teeth without cutting the material.

2. In a mill of the character described, opposed relatively movable disks, said disks being arranged to receive the material at the center and discharge it at the periphery, means on said disks for imparting an initial disintegrating action to the material, and teeth on said disks cooperating with the teeth of the other disks and so inclined and disposed with relation to the teeth of the other disk as to cause cooperating teeth to roll, crush and rub the material between the same without cutting the material.

3. In a mill of the character described, opposed relatively-movable disks, a series of rows of elongated teeth on each of said disks radially arranged with the distance between the teeth gradually increasing from the center to the periphery of the disks, the inner teeth being so inclined as to cause opposing disks to disintegrate the material and the other teeth being so inclined and disposed with relation to the teeth of the other disk as to cause the material to be rolled, crushed and rubbed between opposing teeth without cutting the material.

4. In a mill of the character described, opposed disks, teeth on said disks which extend substantially in a radial direction, those teeth which initially act upon the material being inclined from base to tip in the direction of rotation and the teeth which subsequently act upon the material being inclined from base to tip oppositely to the direction of rotation.

5. In a mill of the character described, opposed oppositely rotating disks, a series of rows of teeth radially arranged upon each disk, those teeth nearest the center of their disk being formed to disintegrate the material and the balance of the teeth being inclined from base to tip oppositely to the direction of rotation of said disks.

6. In a mill of the character described, opposed relatively movable disks, a row of elongated teeth radially arranged on each disk to oppose each other, said teeth being inclined from base to tip oppositely to the direction of rotation of the disk upon which they are carried.

7. In a mill of the character described, a pair of opposed relatively movable disks, a plurality of teeth on each disk with the teeth of one disk arranged in opposition to the teeth of the other disk, said teeth having opposed surfaces so disposed with respect to the direction of revolution as to be free from effective cutting edges and adapted to roll and press the material between the same without cutting the same.

In testimony whereof, I have hereunto set my hand this 6th day of March, 1928.

ERWIN H. HUSSEY.